Nov. 15, 1938.  K. BRENKERT  2,136,670
PHOTOELECTRIC CELL ARC CONTROL
Filed Feb. 23, 1937  2 Sheets-Sheet 1
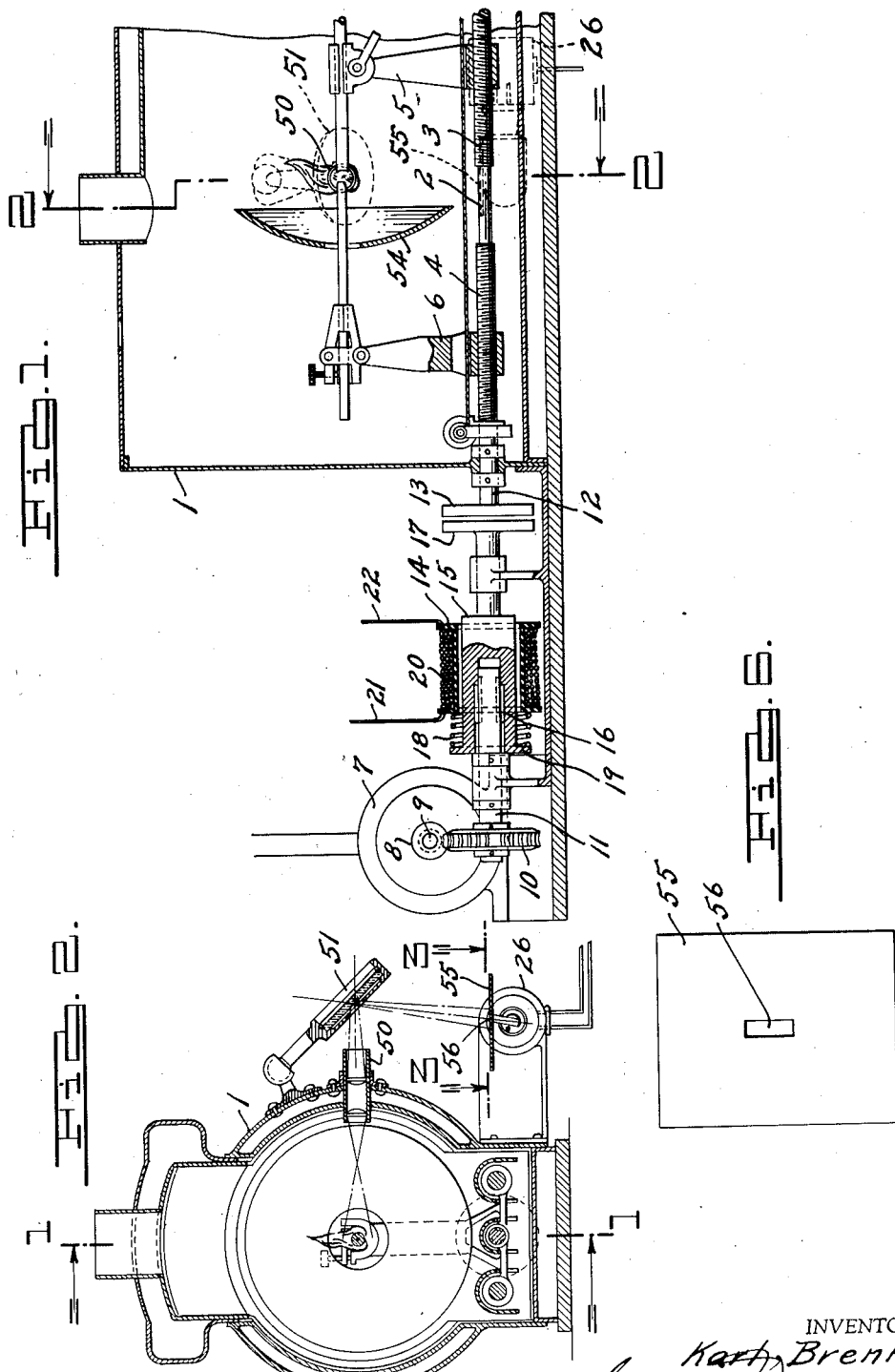
INVENTOR.
Karl Brenkert
BY Samuel Weisman
ATTORNEY.

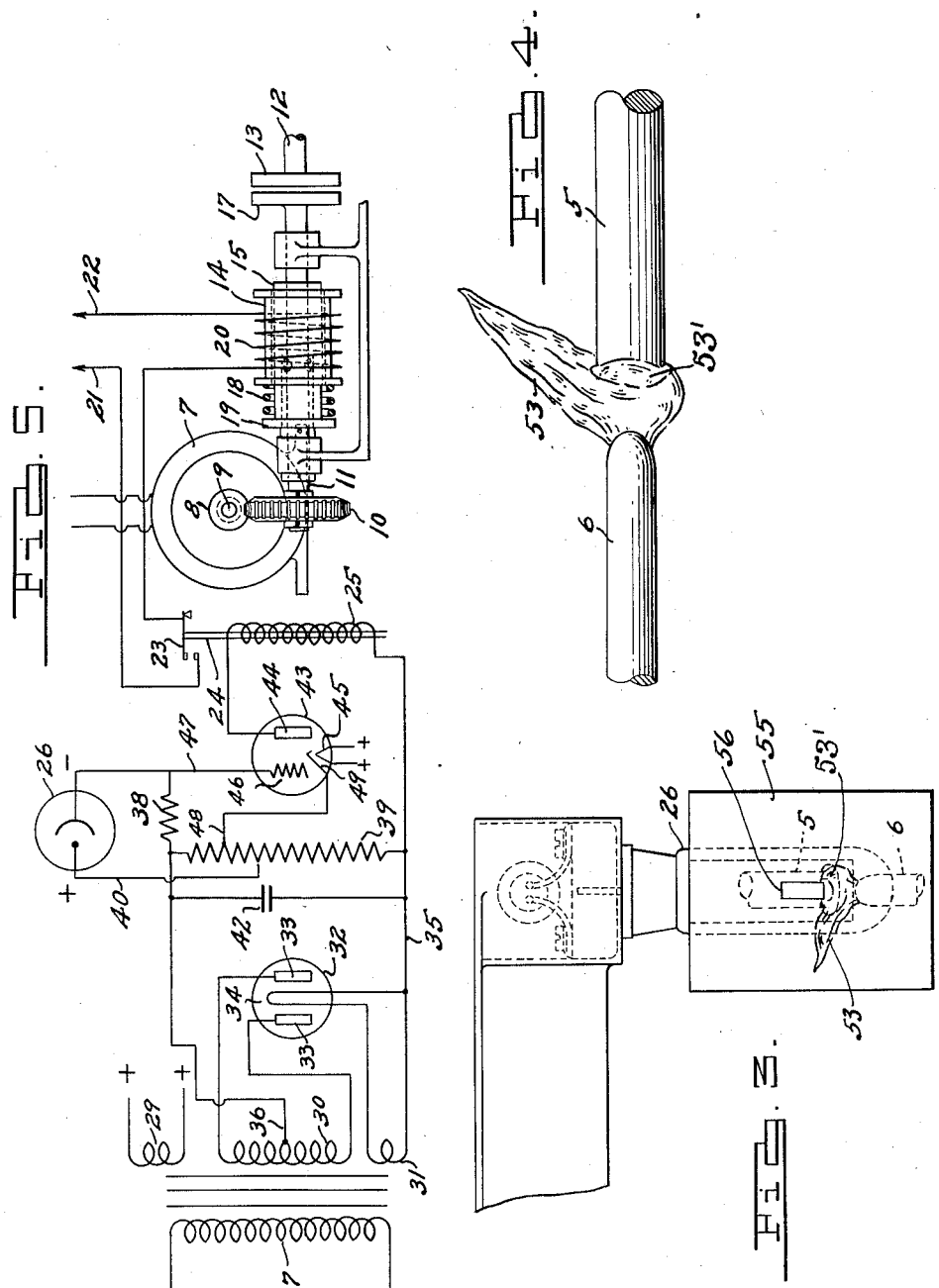

Patented Nov. 15, 1938

2,136,670

UNITED STATES PATENT OFFICE 2,136,670

PHOTOELECTRIC CELL ARC CONTROL

Karl Brenkert, Detroit, Mich.

Application February 23, 1937, Serial No. 127,017

4 Claims. (Cl. 176—102)

The present invention pertains to a novel control for feeding the carbon electrodes in an arc lamp.

In projection lamps, especially for use in theaters, the present tendency is to use an optical system of as high efficiency as practically possible, with respect to the reflector for directing the light out of the lamp housing. Up to the present time, it has been possible to realize a pick-up of 140°, as compared with a maximum possible pick-up of 180°. In the earlier types of lamps, the pick-up was as low as 60°.

The use of higher pick-up angles requires a correspondingly more accurate position of the arc with relation to the focal point of the reflector. This in turn requires instantaneous and highly accurate feeding mechanism for the carbons as they burn away. For example, with a pick-up angle of 140°, the tolerance in the position of the arc is only $\frac{1}{32}''$, or $\frac{1}{64}''$ on either side, for correct and efficient reflection.

Within these limits, the feeding mechanisms hitherto employed have not been entirely satisfactory. Those operating electrically or magnetically in response to changes in the voltage across the arc have a lagging action that retards the actual feeding so that they are not immediately responsive to the changing position of the arc. Mechanical systems also have such a lag, somewhat in proportion to the number of moving parts employed.

The object of the present invention is to provide a control for the electrode feeding mechanism that operates accurately and instantaneously within the limits mentioned above, or at least more satisfactorily than mechanisms of prior construction. This object is accomplished primarily by means of a photo-electric cell exposed to the light of the arc and governing the operation of the feeding mechanism. More specifically, the feeding mechanism contains a clutch actuated by an electro-magnet receiving its current through a relay governed by the photo-electric cell.

The flaming arc has various qualities and intensities of light to which the cell is sensitive but which are not important for the purpose of projection. Consequently, the successful operation of this system depends upon causing the cell to be unaffected by the useless lights and affected only by the so-called crater which is the only important part of the arc for the purpose of illumination. Moreover, as the crater or gas ball is of a substantial size, having its greatest intensity at the center, accurate feeding requires that the cell operate only in response to changes in the position of a selected part of the gas ball.

Another object of the invention is to so modify the cell that it accomplishes these results. In keeping with this object, the cell is shielded by a screen of special design, exposing the cell to only a selected part of the gas ball that actually determines the quality of the projected light, as will be described more fully hereinafter.

More specifically, the selected part of the gas ball is an intermediate vertical portion thereof determined by admitting to the cell less than the entire vertical extent of the image of the gas ball. This portion not only represents the maximum intensity of useful light but also permits vertical shifting of the gas ball without affecting the feeding mechanism. Such limitation of the image projected upon the cell is important in view of the fact that the gas ball is likely to shift up or down because of various influences such as the varying nature of the electrode material, air drafts in the lamp housing and fluctuation in operating voltage. None of these conditions should affect the operation of the feeding mechanism, and they are rendered ineffective in this respect by the restriction of the image as above described, since the area of image projected upon the cell is not altered by the vertical shifting.

The invention is fully disclosed by way of example by the following description and the accompanying drawings, in which Figure 1 is a longitudinal section of a projection machine and the magnetic clutch through which the electrode feed is actuated;

Figure 2 is a transverse vertical section of the projector on the line 2—2 of Figure 1;

Figure 3 is a plan section on the line 3—3 of Figure 2, showing also the image of the arc projected on the screen or shield;

Figure 4 is a detail elevation illustrating certain characteristics of the arc plane, and Figure 5 is a wiring diagram of the circuit operating the magnetic clutch, showing also the clutch in elevation.

Reference to these views will now be made by use of like characters that are employed to designate corresponding parts throughout.

The numeral 1 designates the housing of a projection lamp of the type shown, for example, in my United States Patent No. 2,040,596 of May 12, 1936. In the base of the housing is journaled a worm 2 with reverse threads passing through a pair of electrode holders 3 and 4. The latter in turn carry respectively the positive electrode 5 and the negative electrode 6 for forming an arc in a manner already well known in the art.

The worm 2 is driven from an electric motor 7 through any suitable means. Such means may consist, for example, of a worm 8 on the motor-shaft 9, connecting with a worm gear 10, from the center of which extends a shaft 11 in line with the worm 2. The latter also has a shaft extension 12 adapted for connection with the shaft 11 through a clutch having one of its plates 13 on the shaft extension 12. A portion of the shaft 15 is surrounded by a stationary solenoid 14 having a core in the form of a short shaft 15 slidably keyed at 16 to the shaft 11. The exposed end of the shaft 15 carries the remaining clutch plate 17 lying adjacent to the plate 13 and adapted for engagement therewith. The clutch is normally disengaged by means of a spring 18 bearing against the solenoid 14 and against a collar 19 fixed on the shaft 15. The clutch is engaged, to discontinue the feeding of the electrodes 5 and 6, when current flows through the winding 20 under the conditions presently to be described.

Current is supplied to the winding 20 through a pair of mains 21 and 22, in the former of which is inserted a relay comprising a switch blade 23. This blade is carried by an armature 24 passing through a solenoid 25 controlled by the means presently to be described.

Flow of current to the solenoid 25 is governed by a photoelectric cell 26 exposed to the light of the arc in a manner presently to be described. The wiring of the cell in the solenoid circuit as well as amplification of current from the cell and rectifying of current to the cell, if necessary, is conventional and may be accomplished in numerous ways known in the art. The wiring diagram illustrated in the drawings is merely an example of one system of wiring.

If alternating current is used, it is introduced into the system from the primary winding 27 of a transformer connected across the source 28. Adjacent to the primary winding are 3 secondary windings 29, 30 and 31. A rectifier tube 32 has its plates 33 connected respectively to the ends of the secondary winding 30. The filament 34 of the tube 32 has its ends connected respectively to the ends of the secondary winding 31. One end of the filament is further joined by a conductor 35 to one end of the solenoid 25. The secondary winding 30 is tapped by a conductor 36 leading to the negative pole of the cell 26, with a resistance 38 inserted. Across the conductors 35 and 36 is connected a rheostat 39 which is tapped by a conductor 40 to the positive pole 41 of the cell. Across these conductors is also connected a condenser 42. An amplifier tube 43 is connected between the cell and the solenoid 25, the remaining end of the solenoid being connected to the plate 44 of the tube. The filament 45 of the tube is connected to the ends of the secondary winding 29. The grid 46 of the tube is connected by a conductor 47 to the end of resistance 38 nearer the negative pole 37 of the cell 26. The rheostat 39 is further tapped by another conductor 48 leading to the second plate 49 of the amplifier tube 43. The operation of this system is to deliver an amplified current to the solenoid 25 when the photo-electric cell 26 is active, whereupon the relay 23 is closed and the solenoid 14 is energized to disengage the clutch 13, 15, against the action of the spring 18.

The cell 26 is mounted in a suitable position to receive light from the arc and is preferably supported close to the lamp housing 1. In the construction illustrated, a lens tube 50 is mounted in the wall of the housing 1 in a position to receive light from the arc and transmit it to a reflector 51 reflecting the light to the cell 26. The lens tube 50 contains a pair of plano-convex lenses 52, with their convex surfaces facing each other, for enlarging and sharply defining the image of the arc projected towards the cell 26.

The arc produced by the electrodes 5 and 6 is comprised of several qualities of light. For example, a blue flame 53 issues from the negative electrode 6, the burning end of the positive electrode 5 is red or yellow, while in the tip or crater of the positive electrode is a white gas ball 53' enveloped in the flame 53. The gas ball is the only useful and critical part of the arc for projection purposes and must be accurately positioned with respect to the reflector 54 behind the arc. Consequently, for successful operation of the feeding mechanism through the photoelectric cell 26, it becomes necessary to so modify the cell that it is affected only by the gas ball and not by the other parts of the arc to which it might otherwise be sensitive. To effect this result, a shield 55 is placed adjacent to the cell 26 in the path of reflection from reflector 51, to receive the image of the arc and admit only a selected portion thereof to the cell.

The selected part of the arc image is admitted to the cell through a slot 56 cut in the shield along the longitudinal axis of the image or in the direction of movement of the electrodes in their image. The slot is considerably narrower than the diameter of the gas ball, and consequently the shield screens out the marginal flickering part of the gas ball and flame and admits only the constant, stable part of the arc image to the cell 26.

The slot 56, being narrower than the diameter of the gas ball, shuts out the top and bottom of the gas ball from the cell and admits only an intermediate vertical portion thereof, although the top and bottom of the gas ball also furnish light of useful intensity. This relative height of the slot renders the cell and the feeding mechanism unresponsive to substantial vertical shifting of the gas ball and is important for the reason that such shifting occurs in operation because of variable conditions such as the composition of the electrode material, upward drafts in the lamp housing, fluctuation of voltage and the like Where feeding of the electrodes occurs during activity or exposure of the photo-electric cell, as illustrated and described herein, the slot 56 lies on the receding side of the correct position of the gas ball image, that is, the side towards which the gas ball moves as the positive carbon burns away. When the gas ball is properly positioned, its image lies entirely at one end of the slot, so that its light does not reach the cell 26, with the result that the cell is then inactive and the feeding mechanism is idle. As the gas ball recedes in the burning of the positive electrode, its image overlaps the slot 56, admitting light to the cell and closing the relay 23. Thereupon, the solenoid 14 is energized, throwing in the clutch 13, 15 and turning the worm 2 to feed the carbons until the image of the gas ball is returned to the correct position off the slot.

In the operation described, only the forward tip of the slot is utilized. The remaining length of the slot comes into operation after trimming the electrodes, when they are usually spaced too far apart. The gas ball then throws its image across the slot, causing the electrodes to be fed together until the image of the gas ball has advanced beyond the forward end of the slot.

The invention is also applicable where the feeding mechanism is actuated during absence of light on the cell 26. In such case, the slot 56 would be located on the advancing side of the image of the gas ball to throw light on the cell and arrest the feeding mechanism while the image is in the correct position, and to darken the cell and set the feeding mechanism in action when the image of the gas ball moves out of the correct position.

By using the photo-electric cell as the sensitive element of the system, the number of mechanical parts for starting and stopping the feeding mechanism is reduced to a minimum, thereby also reducing the lag incident to mechanical parts and providing a practically instantaneous response to the varying position of the arc. Moreover, the position of the arc is governed directly by its light rather than indirectly by a secondary property such as its voltage or heat which may not always bear a constant relation to the position or intensity of the arc. Such immediate and direct response of the feeding mechanism maintains the arc within the narrow limits permissible in conjunction with a reflector having a high pick-up angle, as previously set forth.

Finally, the operation of the photo-electric cell and the feeding mechanism is influenced only by a selected part of the arc that is properly representative of the whole arc, by screening out the marginal unstable parts of the arc that might otherwise be capable of affecting the cell. Owing to the sensitiveness of cell and the described position of the slot 56, the forward end of the slot is critical in determining actuation or idleness of the feeding mechanism, inasmuch as these conditions are determined by the presence or absence of light across this end of the slot. The position of the arc is thereby maintained within the permissible limits already mentioned, and the control across the forward end of the slot is so accurate that the feeding mechanism operates about once per second.

Although a specific embodiment of the invention has been illustrated and described, it will be understood that various alterations in the details of construction may be made without departing from the scope of the invention, as indicated by the appended claims.

What I claim is:

1. In an arc lamp having electrodes for forming an arc having its maximum intensity in a substantially enveloped gas ball, an optical focusing system for the arc, mechanism controlled directly by the light of the arc for feeding said electrodes, the combination of a photo-electric cell controlling the actuation of said mechanism, means for projecting the image of the arc upon said cell, and a fixed shielding screen placed adjacent to said cell in a position to intercept said image, said screen having a slot positioned to admit to the cell an intermediate vertical portion of the image of said gas ball having substantially less than the entire vertical extent of the gas ball image, whereby the operation of the cell is determined by the presence or absence of said portion of the image with respect to said slot and is unaffected by normal vertical shifting of said image.

2. In an arc lamp having electrodes for forming an arc having its maximum intensity in a substantially enveloped gas ball, an optical focusing system for the arc, mechanism controlled directly by the light of the arc for feeding said electrodes, the combination of a photo-electric cell controlling the actuation of said mechanism, means for projecting the image of the arc upon said cell, and a fixed shielding screen placed adjacent to said cell in a position to intercept said image, said screen having a slot positioned to admit to the cell an intermediate vertical portion of the image of said gas ball having substantially less than the entire vertical extent of the gas ball image, whereby the operation of the cell is determined by the presence or absence of said portion of the image with respect to said slot and is unaffected by normal vertical shifting of said image, said slot having a greater length than the distance the position of the image is permitted to vary lengthwise of said electrodes, whereby said slot permits operation of the cell to bring the electrodes to proper position after trimming.

3. In an arc lamp having an arc reflector with a pick-up angle of approximately 140° and having electrodes for forming an arc having its maximum intensity in a substantially enveloped gas ball, an optical focusing system for the arc, mechanism controlled directly by the light of the arc for feeding said electrodes, the combination of a photo-electric cell controlling the actuation of said mechanism, means for projecting the image of the arc upon said cell, and a fixed shielding screen placed adjacent to said cell in a position to intercept said image, said screen having a slot positioned to admit to the cell an intermediate vertical portion of the image of said gas ball having substantially less than the entire vertical extent of the gas ball image, whereby the operation of the cell is determined by the presence or absence of said portion of the image with respect to said slot and is unaffected by normal vertical shifting of said image.

4. In an arc lamp having an arc reflector with a pick-up angle of approximately 140° and having electrodes for forming an arc having its maximum intensity in a substantially enveloped gas ball, an optical focusing system for the arc, mechanism controlled directly by the light of the arc for feeding said electrodes, the combination of a photo-electric cell controlling the actuation of said mechanism, means for projecting the image of the arc upon said cell, and a fixed shielding screen placed adjacent to said cell in a position to intercept said image, said screen having a slot positioned to admit to the cell an intermediate vertical portion of the image of said gas ball having substantially less than the entire vertical extent of the gas ball image, whereby the operation of the cell is determined by the presence or absence of said portion of the image with respect to said slot and is unaffected by normal vertical shifting of said image, said slot having a greater length than the distance the position of the image is permitted to vary lengthwise of said electrodes, whereby said slot permits operation of the cell to bring the electrodes to proper position after trimming.

KARL BRENKERT.